April 5, 1927.
D. P. OWENS
1,623,201
CUTTER
Filed July 10, 1925
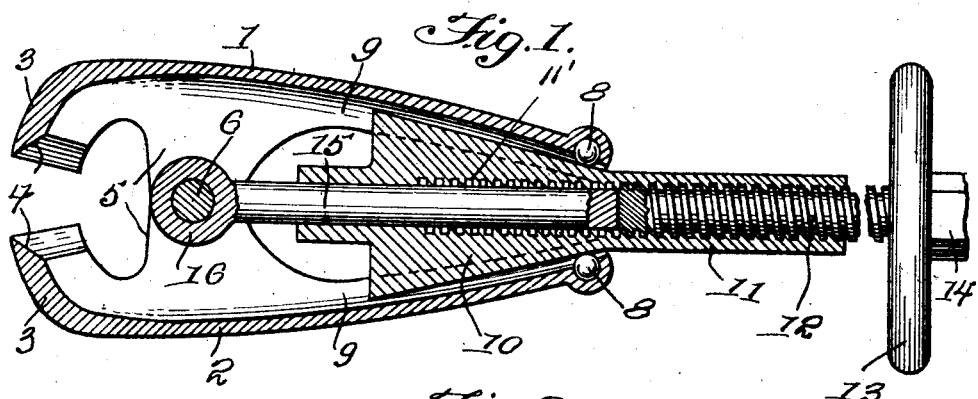
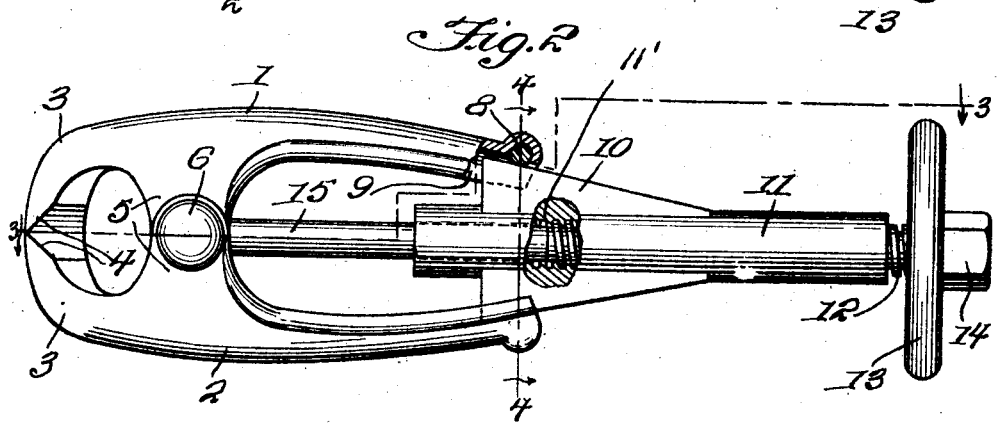
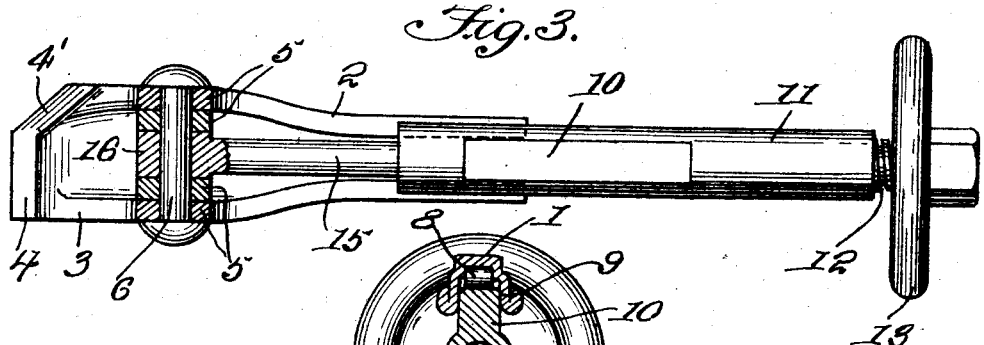
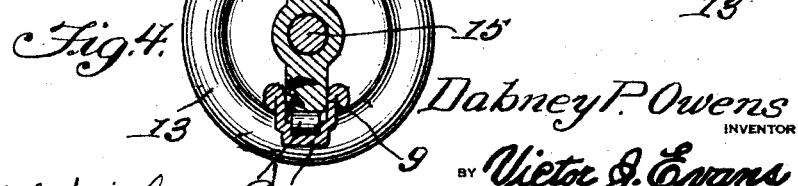
Dabney P. Owens
INVENTOR
BY Victor J. Evans
ATTORNEY
WITNESS:

Patented Apr. 5, 1927.

1,623,201

UNITED STATES PATENT OFFICE.

DABNEY P. OWENS, OF LAKE WORTH, FLORIDA.

CUTTER.

Application filed July 10, 1925. Serial No. 42,739.

My present invention has reference to a cutter for severing the heads from bolts, rivets or the like, and among the objects of my invention is the provision of a tool for this purpose which may be successfully employed where only small working space is permitted; a tool for this purpose which includes a pair of cooperated pivotally associated jaws and wedge means for moving the jaws toward each other so that an object engaged between the jaws will be severed in an easy and expeditious manner; a tool for this purpose in which the frictional engagement between the working parts is reduced to a minimum; a tool for this purpose in which a pushing action is exerted against the pivot member of the jaws to impart a longitudinal movement to a wedge which cooperates with the jaws in a manner to force the active or cutting edges of the jaws toward each other, and finally to produce a nut or bolt cutter of great strength and rigidity in construction, which may be cheaply manufactured and marketed and easily operated.

To the attainment of the foregoing reference is to be had to the drawings which accompany and form part of this application.

In the drawings:—

Fig. 1 is an approximately central longitudinal sectional view through the improvement, the jaws being in open position;

Fig. 2 is a side elevation of the improvement, with parts in section, the jaws being closed;

Fig. 3 is a sectional view on the line 3—3 of Fig. 2; and

Fig. 4 is a sectional view on the line 4—4 of Fig. 2.

My improved device will be found efficient for its useful purpose in cutting the heads of bolts or rivets regardless of their location and in places which are not accessible to ordinary devices for this purpose. In practice I have found my improvement particularly useful for cutting bolt or rivet heads from the fenders of automobiles, but of course, the improvement is not to be thus restricted in its useful employment.

As disclosed by the drawings, my improvement comprises two hollow members 1 and 2, respectively, each carrying at its outer end a jaw. Both the jaws have beveled faces 4 from the cutting edges of the said jaws. Each of the members 1 and 2, inward of the jaws 3 are formed with lapping ears 5, and these ears are connected by a pivot 6. The arched bodies of the members 1 and 2 have their ends, opposite that provided with the jaws, formed with pockets for the reception of anti-frictional elements 8, the said pockets being provided in a line with inner guide passages 9 and the edges of a wedge member 10. The wedge member 10 has a barrel extension 11 at its outer reduced end, the said barrel being interiorly threaded as at 11'. Engaging the threads 11' of the barrel 11 there is a screw 12. The screw on its outer end carries a removable handle 13. A nut 14 holds the handle on the screw. This nut is, of course, removed so that a wrench or other implement may grip the squared portion of the screw which is normally engaged by the squared bore of the hand wheel 13. The wrench or like implement is only employed when a greater amount of power is required for operating the device than is ordinary.

The screw 12 is in contacting engagement with a rod 15, and this rod has an eye end 16 which receives the pivot 6 therethrough.

From the foregoing description, when taken in connection with the drawings, it will be noted that when the screw 12 is turned in one direction, the inner end thereof will bear against the rod 15 and acting on the threads of the barrel end of the wedge 10, will force the wedge in the direction of the handle or wheel 13, thus causing the inclined edges of the wedge to travel over the anti-frictional elements 8 to swing the members 1 and 2 to bring their jaws 3 to closed position to positively and easily sever the head of a bolt, rivet or like article acted upon. The wedge being guided in its movement, cannot travel other than in its proper course, and as illustrated in Fig. 2 of the drawings, cannot travel out of its guideways 9. By operating the wheel or handle 13 to turn the screw 12 in a reverse direction the wedge may be again moved inwardly to hold the jaws in open position.

As disclosed by Fig. 3 of the drawings the straight cutting edges 4 of the jaws merge into angle cutting portions 4', on one side of the said jaws. The cutting edges 4' permit of the cutter being employed in close quarters in which instance the body of the tool is held at an angle so that the cutting portions 4' of the jaws will contact with the opposite sides of a bolt to be severed. The openings between the jaws and the ears 5 permit bolt heads dropping therethrough when cut by the improvement.

Having described the invention, I claim:—

1. A device for severing the heads of bolts, rivets or the like, comprising two members, each being substantially U-shaped in cross-section and having their outer edges arched to the ends thereof, each of said members having their outer ends extended toward each other to provide cutting jaws and each of said members having its sides inward of the jaws formed with ears which lap each other, a pivot element passing through the ears, a rod member through which the pivot also passes and which rod is directed toward the rear of the members, a wedge member received between the members, and in which the rod is also received, said wedge member having a threaded bore and a screw threadingly engaging the bore for contacting with the rod, for the purpose set forth.

2. A device for severing the heads from bolts, comprising two cooperating members which are substantially U-shaped in cross-section and which have their outer edges arched from one to their opposite ends, each of said members having its outer end extended inwardly and beveled to provide cooperating jaws and said members having their sides, inward of the jaws, extended to provide lapping ears, elements housed in the members adjacent to the inner ends thereof, a pivot connecting the ears, a rod member having one end journaled in the pivot and directed toward the inner end of the members, a wedge received between the members and contacting the anti-frictional elements therein and said rod freely passing in said wedge member, said wedge member having a threaded bore and a barrel extension whose bore is also threaded, and a handle-operated screw member threaded in the bore of the wedge member and contacting with the end of the rod, for the purpose set forth.

3. A device for severing the heads from bolts, piano rivets or the like, comprising two body members which are hollow and which have their outer ends extended toward each other and beveled and sharpened to provide cutting jaws, said jaws including straight and angle portions, said members inward of the jaws being formed with ear extensions which are arranged in lapping relation and which are pivotally connected, a rod member having one end freely associated with the pivot for the ears, a wedge member between the body members and in contact therewith and in which wedge member the rod is freely received, said wedge member having a threaded bore and a barrel extension which is also threaded, and a handle-operated screw threaded in the barrel of the wedge member and contacting the end of the rod.

In testimony whereof I affix my signature.

DABNEY P. OWENS.